(12) United States Patent
Cheswick (10) Patent No.: US 8,988,458 B2
(45) Date of Patent: Mar. 24, 2015

(54) SYSTEM AND METHOD FOR GENERATING MEDIA THUMBSCAPES

(75) Inventor: William Roberts Cheswick, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 804 days.

(21) Appl. No.: 12/759,292

(22) Filed: Apr. 13, 2010

(65) Prior Publication Data

US 2011/0249004 A1  Oct. 13, 2011

(51) Int. Cl.
*G09G 5/00* (2006.01)
*G06T 11/60* (2006.01)

(52) U.S. Cl.
CPC ..................... *G06T 11/60* (2013.01)
USPC .......................................................... 345/629

(58) Field of Classification Search
CPC ..... G06F 17/30843–17/30858; G06K 9/00711
USPC .................. 345/590–605, 629–641
See application file for complete search history.

(56) References Cited

U.S. PATENT DOCUMENTS

| | | | |
|---|---|---|---|
| 6,912,327 B1* | 6/2005 | Hori et al. ..................... | 382/305 |
| 7,212,666 B2* | 5/2007 | Zhang et al. .................. | 382/162 |
| 7,483,029 B2* | 1/2009 | Crow et al. .................... | 345/441 |
| 7,567,256 B2* | 7/2009 | Hollowbush et al. ......... | 345/618 |
| 7,702,014 B1* | 4/2010 | Kellock et al. ........... | 375/240.08 |
| 7,760,956 B2* | 7/2010 | Lin et al. ....................... | 382/254 |
| 7,992,097 B2* | 8/2011 | Ubillos .......................... | 715/793 |
| 8,269,850 B2* | 9/2012 | Sakagami ................... | 348/222.1 |
| 8,296,797 B2* | 10/2012 | Olstad et al. .................... | 725/41 |
| 2014/0040222 A1* | 2/2014 | Schmitz et al. ................. | 707/705 |

FOREIGN PATENT DOCUMENTS

| WO | WO 01/45391 A1 * | 6/2001 | ............. H04N 5/262 |
|---|---|---|---|
| WO | WO 2008/150017 A1 * | 12/2008 | ............... H04N 9/07 |

OTHER PUBLICATIONS

Coudal Partners, "Brendan Dawes Cinema Redux Print", 1999-2010 Coudal Partners, Inc. http://coudal.com/archives/swapmeat/2007/08/brendan_dawes_c.php.

* cited by examiner

*Primary Examiner* — Charles Tseng (57) ABSTRACT

Disclosed herein are systems, methods, and non-transitory computer-readable storage media for generating a visualization of video content. The method includes receiving video content, receiving user input associated with the received video content, extracting each frame in the video content, processing the extracted frames based on the received user input, and outputting a still image including each of the processed extracted frames positioned sequentially. The still image can include a histogram of sound data associated with the processed extracted frames. The user input can indicate an image adjustment to be applied when processing the extracted frames, a number of frames of video content per column, a paper size, and/or a frame size. The frames can be positioned sequentially in columns and/or rows. The image can be output as an image file or on a printable medium. The image can contain more than one video clip, such as films in a trilogy.

20 Claims, 6 Drawing Sheets

SYSTEM AND METHOD FOR GENERATING MEDIA THUMBSCAPES

BACKGROUND

1. Technical Field

The present disclosure relates to media visualizations and more specifically to visualizing video clips as a still image or thumbscape.

2. Introduction

Videos have a temporal durational aspect which prevents simultaneous viewing of the entire movie at the same instant. Present video display approaches do not allow for viewing the entire movie at an extremely high level view. Video-related professionals, such as a film maker in charge of color consistency, can not quickly view the color palette, scene pacing, color changes, and scene changes for an entire movie at a glance, but must instead wade through perhaps hours of footage. Similarly, the overall tone and color mood of a movie are not visible in a short snippet, but are embedded throughout the entire movie, which requires significant time to view. Further, the elapsed time from the beginning to the end makes it difficult to effectively compare temporally distant portions of a video clip.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The disclosure turns first to an example computing system which can be used with the principles described herein. Next the disclosure turns to a discussion of different media thumbscape generation and output variations. In most of these embodiments, the output of the video content frames is at full resolution, but very small due to ultra high resolution output.

Figure 1:
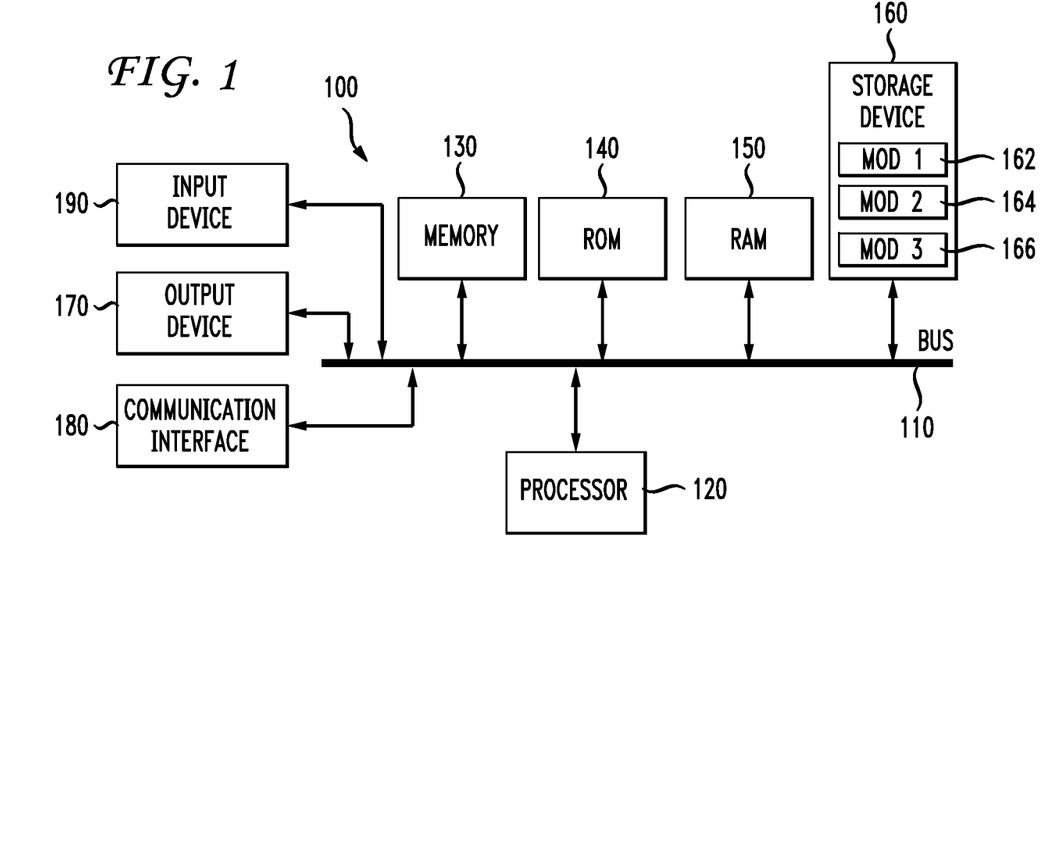
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
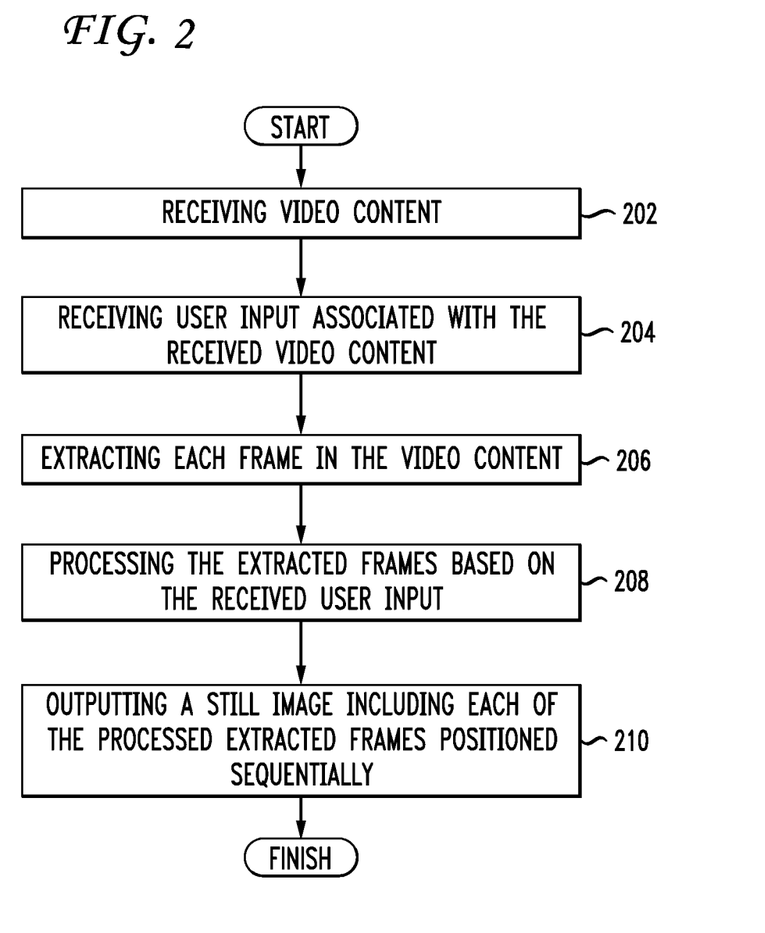
FIG. 2 illustrates an example method embodiment.

Having disclosed some basic system components, the disclosure now turns to the exemplary method embodiment shown in FIG. 2 for generating a visualization of video content. For the sake of clarity, the method is discussed in terms of an exemplary system 100 such as is shown in FIG. 1 configured to practice the method. The general concept disclosed herein is to output a large image of a group of still frames from a video at very high resolution such that each frame is output at full (or near full) resolution but very small.

The system 100 first receives video content (202). The system 100 can receive the video content as a video streamed over a network, video read from a DVD, an MPEG encoded video file on a hard drive, or as a live feed from a video camera. The system 100 receives user input associated with the received video content (204). The user input can indicate one or more of the following: a number of seconds of video content per column or row, a paper height and/or width, a frame size, a border width, a gutter size (the gutter being the space between frames side to side and/or up and down), a frame order, a number of frames per column or row, and an image adjustment to be applied when processing the extracted frames. Some common paper widths for large format printers include 24", 42", 44", and 60". The image adjustment can include one or more of output resolution, gamma, contrast, brightness, hue, sharpness, white balance, rotation, and color shift. In one variation, the user input is a selection of a group of image adjustments associated with a particular output medium. For example, paper is a different medium from film. The system 100 or the user can determine how best to preserve artistic intent of the original film because of the differences between additive and subtractive color models. A user can adjust system 100 determined color correction settings.

The system 100 extracts each frame in the video content (206). If the video content does not include entire frames, i.e. the frames are interlaced or the frames are intermediate frames that only include differences from neighboring frames, the system 100 can generate the missing information for such frames. For example, the system 100 can generate frame information for a bi-directional predictive coded frame based on the surrounding frames using an MPEG decoder. The system 100 then processes the extracted frames based on the received user input (208). The system 100 can process frames using a parallel processing approach.

The system 100 outputs a still image including each of the processed extracted frames positioned sequentially (210), typically as rows and columns. A column can include a number of frames corresponding to a predetermined duration of film, such as 6, 9, 15, or some other number of seconds. The still image can take various forms. For example, the still image can be an electronic image file such as a PostScript, TIFF, JPG, PDF, PNG, EPS, or other computer file. In some cases, in order to accommodate limited output resources for example, the system 100 can split the output file into multiple parts which can be assembled into a still image. In another aspect, the system 100 outputs the still image by printing on a printable medium such as a poster, postcard, wallpaper, wrapping paper, archival quality museum display paper, cloth, an edible item (such as a frosting printer on a sheet cake), puzzle, or a mural. Postcards can include frames from a memorable part of a movie.

For example, a casino can sell postcards of frames of a memorable clip of the film "Viva Las Vegas". A film company can sell wallpaper containing the frames for an entire movie such as Twilight or Avatar or for a season of a television show such as The Simpsons. Christmas wrapping paper can include frames from the 1964 film Rudolph, the Red-Nosed Reindeer. An NFL team can sell a set of four posters, each poster containing the frames of a video of each quarter of their winning Super Bowl game. Custom-order wrapping paper for birthdays or anniversaries can be made from home videos. In some cases where sufficient quantities of still images exist, such as a library of family photos, a collection of astrological images of a night sky from an observatory, or frames from a time-lapse camera, the system 100 can use those still images in place of frames from video content.

For example, a one by two yard thumbnail summary can contain a set of 50,000 family photos. This visualization approach can create a useful view of the entire collection of family photos. For example, winter photos, summer photos, sets of photos from different types of activities, photos taken using different photography equipment, sepia photos, black and white photos, and color photos each have distinct sets of colors which are visibly distinguishable from others in this type of visualization. These distinct sets of colors can enable a person to quickly locate and see entire collections of photos in context.

The system 100 can output via a large format printer such as the HP Designjet L25500 series or other suitable printer. An entire feature-length movie worth of frames printed out on such a large format printer can produce a 60" wide printout over nine meters long at 300 dots per inch (DPI). In one aspect, the printer prints each frame at its full resolution, but with very fine output resolution or DPI. For example, a full 640×480 frame output at 600 DPI would be only 0.9375 inches wide and 0.8 inches tall, but can be smaller than 1 cm across at a higher DPI output. For comparison, a high definition frame at a 1920×1080 resolution printed at 1200 DPI would be 1.6 inches wide and 0.9 inches tall. When the total size of the high-resolution thumbnails exceeds the memory capacity of the printer, the system 100 can downgrade the resolution enough to make it fit in the printer's memory. A significant reduction in resolution may be necessary for certain types of printer, such as reducing the thumbnails down to about 300 DPI from a printer's standard 600 DPI resolution. This approach can be adjusted to handle changes in printer memory capacity or higher or lower image resolutions. In one aspect to save memory and/or space on the print output, the system 100 can output every other still image in the series of still images. This approach would preserve much of the visualization component, but would halve the amount of space required.

In one aspect, the system 100 outputs a series of still images, each still image containing a collection of frames representing 30 seconds of video (or 720 frames at 24 frames per second), for example. The system 100 can easily substitute these with other numbers of frames and other periods of time. The system 100 can then arrange the series of still images (each containing 30 seconds in this example) as a video (instead of just a still image) that demonstrates at a very high level the overall color tone of the movie in an extremely short clip. For example, a 90 minute movie at 24 frames per second is roughly 129,600 frames. A 90 minute movie can be broken down into 180 still images of 720 very small, sequentially arranged original frames each. These 180 still images can be played back in approximately 7.5 seconds at 24 frames per second. This 180 frame animated visualization can be played back at different speeds or paused to allow for more comprehensive analysis and comparison of the overall color scheme and palette changes. If the 90 minute movie is broken down into series of still images each containing 1 second (or 24 frames), a video of the resulting still images at 24 frame per second would be approximately 225 seconds (or 3.75 minutes) long.

Figure 3:
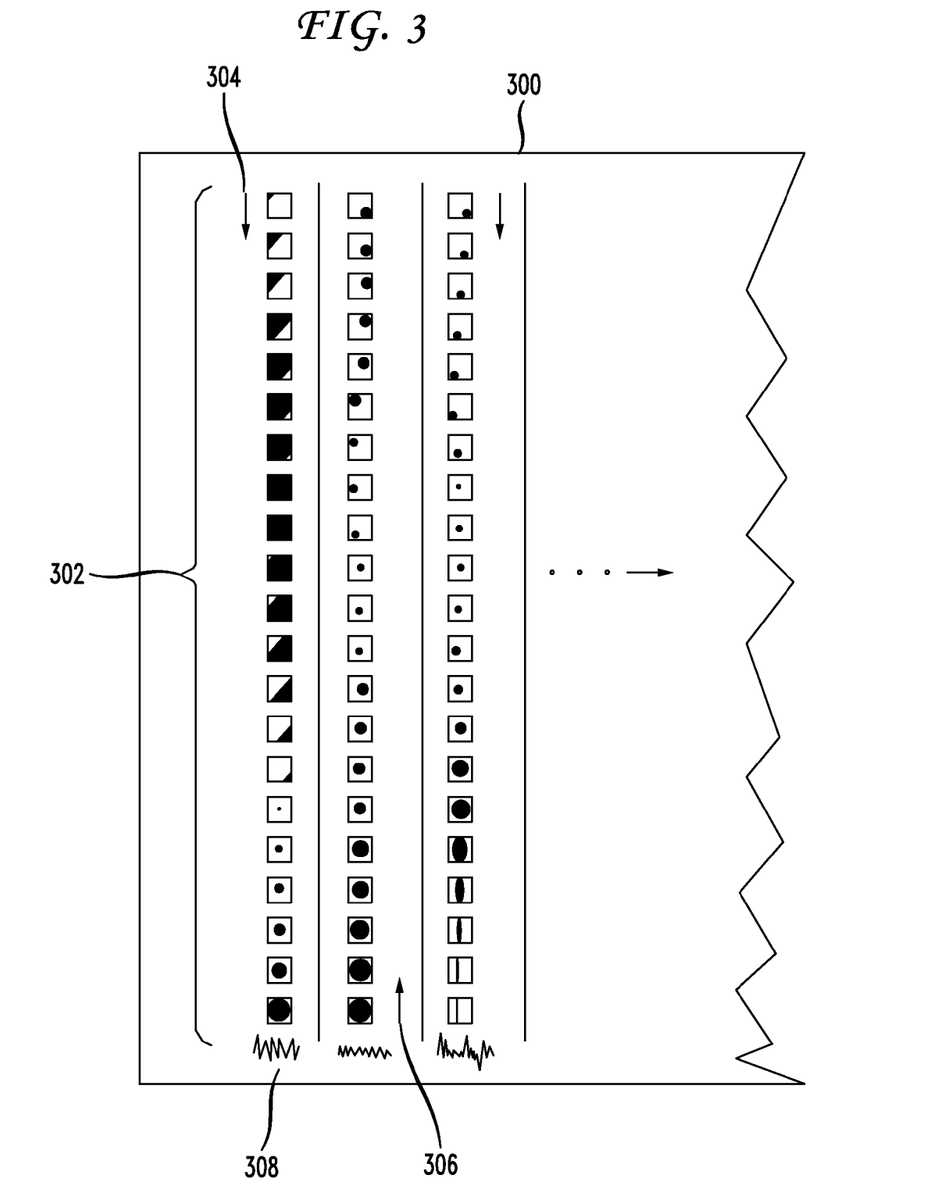
FIG. 3 illustrates an example output of a single video.

The disclosure now returns to a discussion of non-animated outputs. For example, FIG. 3 illustrates an example output 300 of a single video. The frame contents here are exemplary and do not represent any actual film or video strip. The exemplary frame contents illustrate some of the potential variations which can become apparent in this visualization approach. In this example, the output frames are arranged in sequential columns 302 which proceed left to right. Each column is composed of a series of frames. In one aspect, the system outputs the frames positioned sequentially boustrophedonically. For example, the first column includes frames from top to bottom 304, the next column includes frames from bottom to top 306, the next column includes frames from top to bottom, and so forth. The system can output all columns from top to bottom as well.

In one aspect, each column contains a convenient number of frames corresponding to a predetermined amount of time, such as 6 or 10 seconds. The system 100 can output a timestamp at the end of one or more column or row indicating to which portion of the movie that column or row corresponds. For example at the top of every $5^{th}$ column the system can include a timestamp such as 0:00:30, 0:01:00, 0:01:30, and so forth. The principles disclosed herein for columns can be equally applied to rows.

In another variation, the system 100 can also include audio data corresponding to the extracted frames. For example, the system 100 can extract audio information from the received video content, perform an analysis of the extracted audio information, and output a histogram 308 or audio spectrogram within the still image positioned to demonstrate a relationship between the extracted audio information and each of the processed extracted frames. In this case, the histogram 308 is located directly below a column of frames and provides a compressed representation to the movie audio during the frames in the column. Such a graphical representation of the audio can provide insight into the rhythm and other sound patterns of the video. Further, the system 100 can output all or part of the subtitles associated with the frames, if any.

Figure 4:
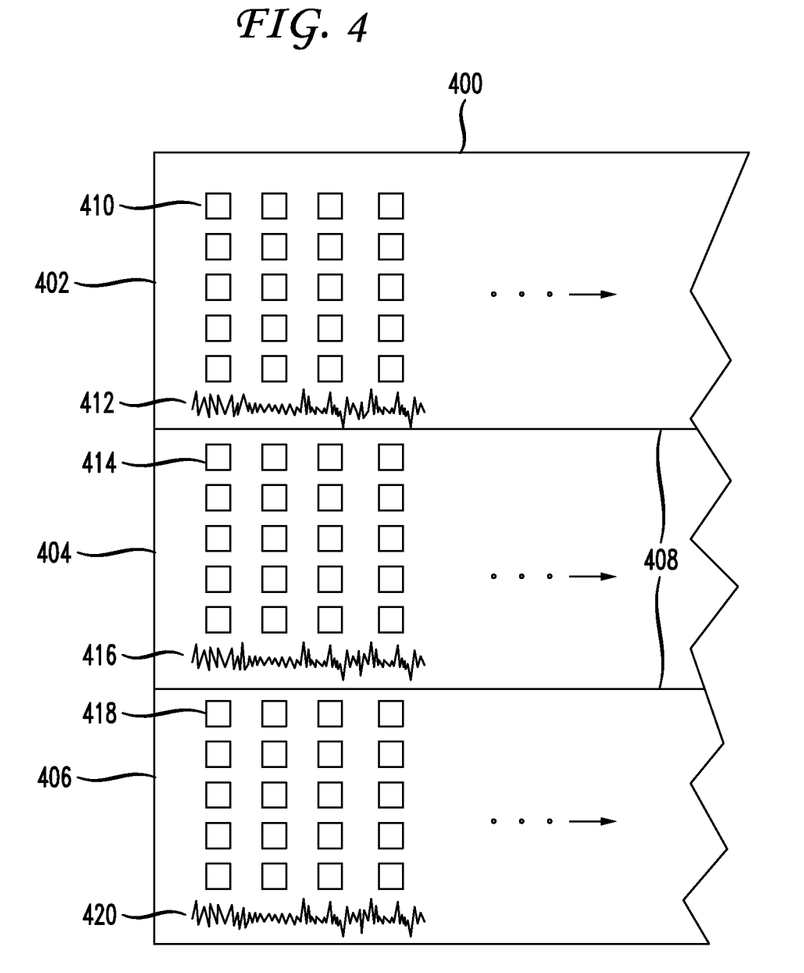
FIG. 4 illustrates an example output of multiple videos.

FIG. 4 illustrates an example output 400 of multiple videos. In this case, the video content is a group of separate video clips, such as a movie trilogy, music videos, or episodes in a television series. The system 100 can output one set of sequentially positioned extracted frames for each of the group of separate video clips aligned one with another. For example, the system 100 receives Episodes IV, V, and VI of Star Wars. If the output is 60" wide printed paper, the system 100 can divide the 60" space into three rows 402, 404, 406 of 20" each 408. The system 100 extracts the frames and/or generates audio histograms for the movies in series or in parallel. The system 100 then starts the first frame 410 of Episode IV in the first small column of the first row 402, the first frame 414 of Episode V in the first small column of the second row 404, and the first frame 418 of Episode VI in the first small column of the third row 406. The system 100 can also output the histograms 412, 416, 420 corresponding to each small column directly under each small column or some other location, such as in a separate audio portion of the printed output for all three histograms apart from the frame output. In addition, the system can 100 include a unified timestamp for all three movies if the outputs are temporally aligned.

This approach can provide a simple way to compare and contrast color and/or audio progression through a television or movie series. In the example of all three Star Wars movies side by side, a person looking at an image of the sets of frames from the original Star Wars trilogy could easily identify movie scenes by color and position, such as the stark contrasts from the light sandy brown of Tatooine and the blackness of space in Episode IV, the white swath of frames from Hoth in Episode V, the green and brown swath of frames from Endor in Episode VI, and the sudden streaks of bright red light from Darth Vader's lightsaber in all three. Similar comparisons could be made for other collections of movies such as the Lord of the Rings trilogy, Rocky, Harry Potter, or Batman.

Figure 5:
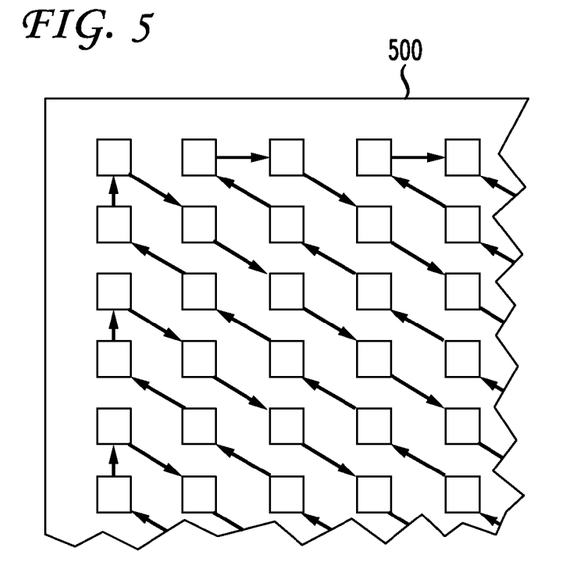
FIG. 5 illustrates a first example frame output pattern.
Figure 6:
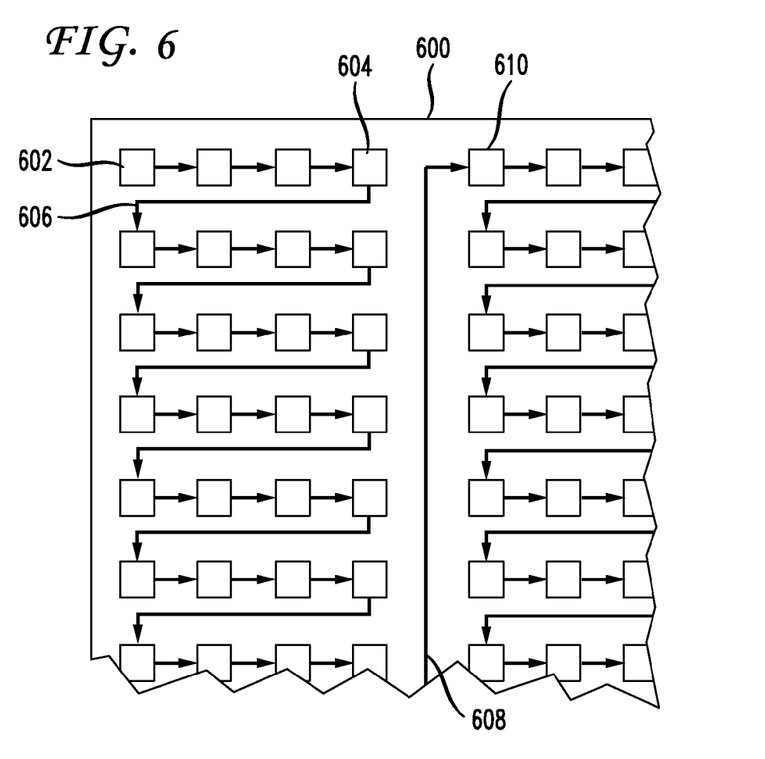
FIG. 6 illustrates a second example frame output pattern.

The details of the sequential arrangement of frames can take many forms. For example, FIG. 5 illustrates a diagonal, boustrophedonic frame output pattern 500. FIG. 6 illustrates a second example frame output pattern 600. This pattern has rows 602 of frames which terminate after a specific number of frames and return 606 to a start position for the next row immediately below. When the rows reach the desired bottom of the output media, the pattern returns 608 to the top and starts a new column 610. These and other frame output arrangements and layouts are contemplated as within the scope of this disclosure. Sequential layouts are not necessarily linear and in fact in some sequential layouts temporally consecutive frames may not be immediately adjacent to one another.

Figure 7:
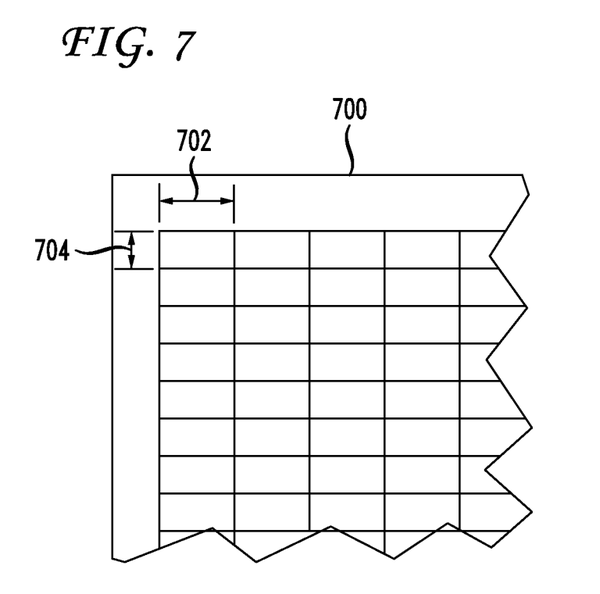
FIG. 7 illustrates an example output of frames in a widescreen format with no border space between frames.

FIG. 7 illustrates an example output 700 of frames in a widescreen format with no border space between frames. Because the frames are widescreen, meaning that the width 702 is far greater than the height 704. Some common widescreen aspect ratios include 16:9, 1.85:1, and 2.39:1. The calculations for appropriately outputting these frames are different from those used for frames in a non-widescreen format, such as those shown in FIG. 8. Some common non-widescreen aspect ratios include 4:3 and 3:2, where the width 802 and height 804 are roughly the same.

Figure 8:
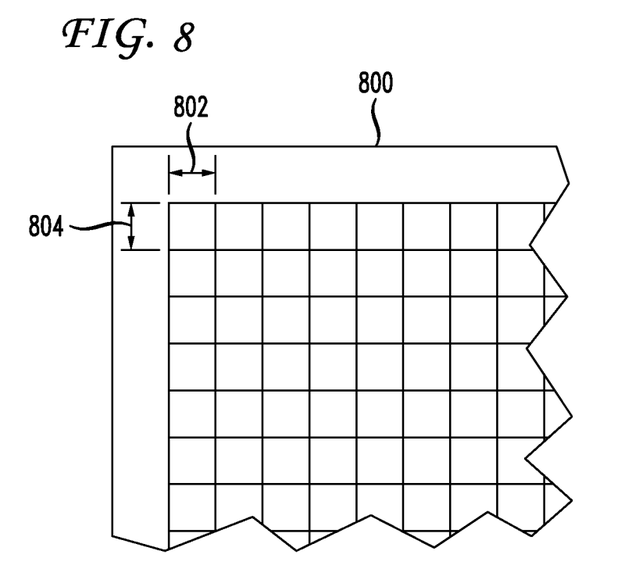
FIG. 8 illustrates an example output of frames in a non-widescreen format with no border space between frames.

While FIGS. 7 and 8 demonstrate placing the frames immediately adjacent to each other in each direction, the system 100 can also output the frames slightly separated in any or all directions. For example, the system 100 can include a blank gutter of 0.5 cm, for example, between each column of frames, or the system 100 can include a small space in between rows of frames. In one aspect, the system 100 or the user determines the size and color of the space between the frames. For example, in some movies, a black gutter is desirable, where in other movies a white gutter is desirable. In some example, the system 100 does not leave the space between frames blank, but inserts a line or other separator between columns and/or rows (such as the lines shown between columns in FIG. 3. The audio histogram and/or subtitles can be inserted vertically in place of the lines shown in FIG. 3, for example.

In one variation, the outputted frames are not of uniform size. For example, the system 100 can divide the video content into 60-second segments, one for each super column. At the top of each super column, the system prints the first frame in a large enough format to discern easily with the naked eye. Below the large first frame, the system 100 outputs the remaining frames of the 60-second segment as smaller frames in multiple columns of smaller widths than the large frame's width. The system 100 can arrange the small frames such that they all fit in columns under the large frame. For example, one large frame can provide a key thumbnail for a 60-second segment of 4 smaller columns immediately below the large frame. This approach can still provide the overall color, tone, and palette impressions of printing frames of the entire movie side by side, but also provides a large reference frame to indicate quickly to a user exactly where in the movie a particular segment of columns depicts without closely examining a tiny frame with a magnifying glass. This approach can be used in conjunction with the timestamp approach set forth above, where the timestamp indicates the temporal position of the large key frame.

In another variation, the system 100 can output one or more key color frame, row, or column for visual comparison. For example, if a cartoon director wants to ensure that certain character colors (such as a particular shade of red) are used consistently throughout a movie, the system 100 can insert in the middle of the still image a row of frames which serve as "swatches" of that particular shade of red for reference with the actual frames of the film. This approach can be used with more than one particular color and/or shade as well. The system can juxtapose reference swatches in between the frames of the movie and/or can output references swatches at the top or bottom of the image so as not to disturb the sequential frame layout.

The system 100 can vary the translation of specific frames to show a particular feature or event of a movie. For example, the system 100 can reverse video for each frame containing a gunshot or explosion. This effect can highlight the pacing of the action, or visualize the violence in the whole movie so that a person can see these elements at a glance.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles disclosed herein may be applied to film production and editing pedagogy. Those skilled in the art will readily recognize various modifications and changes that may be made to the principles described herein without following the example embodiments and applications illustrated and described herein, and without departing from the spirit and scope of the disclosure.

I claim:

1. A method comprising:
receiving video content;
receiving user input associated with the video content;

extracting each frame in the video content, to yield frames;
processing, by a processor, the frames based on the user input, to yield processed frames; and
outputting a single still image comprising each frame of the processed frames positioned sequentially and a single color reference swatch with different shading corresponding to all of the processed frames, such that each frame of the processed frames has a corresponding color in the single color reference swatch.

2. The method of claim 1, wherein the single still image further comprises a histogram of sound data associated with the processed extracted frames.

3. The method of claim 1, wherein the user input indicates one of an image adjustment to be applied when processing the extracted frames, a number of frames of video content per column, a paper size, and a frame size.

4. The method of claim 3, wherein the image adjustment comprises one of gamma, contrast, brightness, hue, sharpness, white balance, rotation, and color shift.

5. The method of claim 1, wherein the frames are positioned sequentially in one of columns and rows.

6. The method of claim 4, wherein the processed frames in the single still image are positioned sequentially boustrophedonically.

7. The method of claim 1, wherein the single still image is output as an electronic image file.

8. The method of claim 1, wherein the single still image is printed on a printable medium.

9. The method of claim 8, wherein the printable medium is one of a postcard, wallpaper, wrapping paper, archival quality museum display paper, cloth, an edible item, and a mural.

10. The method of claim 1, the method further comprising:
extracting audio information from the video content;
performing an analysis of the audio information; and
outputting a histogram within the single still image positioned to demonstrate a relationship between the extracted audio information and each of the processed extracted frames.

11. The method of claim 1, wherein the video content is a plurality of separate video clips.

12. The method of claim 11, wherein outputting the single still image further comprises outputting one set of sequentially positioned extracted frames for each of the plurality of separate video clips.

13. The method of claim 12, wherein sets of sequentially positioned extracted frames are aligned one with another.

14. A system comprising:
a processor; and
a computer-readable storage medium having instructions stored which, when executed by the processor, cause the processor to perform operations comprising:
receiving video content;
receiving user input associated with the video content;
extracting each frame in the video content, to yield frames;
processing the frames based on the user input; and
outputting a single still image comprising each frame of the processed frames positioned sequentially and a single color reference swatch with different shading corresponding to all of the processed frames, such that each frame of the processed frames has a corresponding color in the single color reference swatch.

15. The system of claim 14, wherein the user input indicates an image adjustment to be applied when processing the extracted frames.

16. The system of claim 15, wherein the image adjustment comprises one of gamma, contrast, brightness, hue, sharpness, white balance, rotation, and color shift.

17. The system of claim 14, wherein the frames are positioned sequentially in one of columns and rows.

18. A computer-readable storage device having instructions stored which, when executed by a computing device, cause the computing device to perform operations comprising:
receiving video content;
receiving user input associated with the video content;
extracting each frame in the video content, to yield frames;
processing the frames based on the user input, to yield processed frames; and
outputting a single still image comprising each frame of the processed frames positioned sequentially and a single color reference swatch with different shading corresponding to all of the processed frames, such that each frame of the processed frames has a corresponding color in the single color reference swatch.

19. The computer-readable storage device of claim 18, having additional instructions stored which, when executed by the computing device, result in operations comprising:
extracting audio information from the video content;
performing an analysis of the audio information; and
outputting a histogram within the single still image positioned to demonstrate a relationship between the audio information and each of the extracted frames.

20. The computer-readable storage device of claim 18, wherein the video content is a plurality of separate video clips.

* * * * *